United States Patent
Dory et al.

(10) Patent No.: US 10,021,727 B2
(45) Date of Patent: Jul. 10, 2018

(54) NEAR FIELD COMMUNICATION (NFC) DATA TRANSFER

(71) Applicant: HEWLETT-PACKARD DEVELOPMENT COMPANY, L.P., Houston, TX (US)

(72) Inventors: Jon R. Dory, Fort Collins, CO (US); David H. Hanes, Loveland, CO (US); James Glenn Dowdy, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 15/717,429

(22) Filed: Sep. 27, 2017

(65) Prior Publication Data

US 2018/0020494 A1    Jan. 18, 2018

Related U.S. Application Data (63) Continuation of application No. 14/917,395, filed as application No. PCT/US2013/059105 on Sep. 11, 2013, now Pat. No. 9,788,357.

(51) Int. Cl.
| | |
|---|---|
| *H04W 4/00* | (2018.01) |
| *H04W 76/02* | (2009.01) |
| *H04B 5/00* | (2006.01) |
| *H04W 4/80* | (2018.01) |
| *H04W 76/14* | (2018.01) |

(52) U.S. Cl.
CPC ........ *H04W 76/023* (2013.01); *H04B 5/0031* (2013.01); *H04B 5/0056* (2013.01); *H04W 4/80* (2018.02); *H04W 76/14* (2018.02); *H04B 5/0068* (2013.01)

(58) Field of Classification Search
USPC ................................................ 455/41.1, 41.2
See application file for complete search history.

(56) References Cited

U.S. PATENT DOCUMENTS

| | | | |
|---|---|---|---|
| 7,643,798 | B2 | 1/2010 | Ljung |
| 8,107,879 | B2 | 1/2012 | Pering et al. |
| (Continued) | | | |

FOREIGN PATENT DOCUMENTS

| | | |
|---|---|---|
| CN | 101351813 A | 1/2009 |
| CN | 201417458 Y | 3/2010 |
| (Continued) | | |

OTHER PUBLICATIONS

United States Patent and Trademark Office, "Non-Final Office Action," issued in connection with U.S. Appl. No. 14/917,395, dated Oct. 4, 2016, 13 pages.

(Continued)

*Primary Examiner* — Ganiyu A Hanidu
(74) *Attorney, Agent, or Firm* — Hanley Flight & Zimmerman LLC (57) ABSTRACT

A first device in accordance with an example is placed in a predefined mode in response to removing a near field communication (NFC) tag from an NFC component of the first device. A request is received from a second device to establish a connection with the first device based on data stored on the NFC tag. The first device establishes the connection with the second device and executes the predefined mode.

17 Claims, 5 Drawing Sheets

(56) References Cited

U.S. PATENT DOCUMENTS

| | | |
|---|---|---|
| 8,271,662 B1 | 9/2012 | Gossweiler, III et al. |
| 8,498,572 B1 | 7/2013 | Schooley et al. |
| 8,526,885 B2 | 9/2013 | Lin et al. |
| 9,454,723 B1* | 9/2016 | Cordes ............... H04B 5/0062 |
| 9,788,357 B2 | 10/2017 | Dory et al. |
| 2007/0135078 A1 | 6/2007 | Ljung |
| 2007/0141985 A1* | 6/2007 | Parkkinen ......... H04W 72/0413 |
| | | 455/41.2 |
| 2007/0145152 A1 | 6/2007 | Jogand-Coulomb et al. |
| 2008/0014867 A1* | 1/2008 | Finn .................... G06K 7/0008 |
| | | 455/41.1 |
| 2008/0128505 A1 | 6/2008 | Challa et al. |
| 2008/0272889 A1* | 11/2008 | Symons ................. H02J 7/025 |
| | | 340/10.1 |
| 2009/0046715 A1 | 2/2009 | McCoy |
| 2010/0010721 A1 | 1/2010 | Van Vactor et al. |
| 2010/0012721 A1 | 1/2010 | Jain et al. |
| 2010/0081385 A1 | 4/2010 | Lin et al. |
| 2010/0082448 A1 | 4/2010 | Lin et al. |
| 2012/0171952 A1 | 7/2012 | Ohira et al. |
| 2012/0178366 A1 | 7/2012 | Levy et al. |
| 2012/0238216 A1 | 9/2012 | Hallowell et al. |
| 2012/0309302 A1 | 12/2012 | Buhot |
| 2012/0315848 A1* | 12/2012 | Smith .................. H04B 5/0031 |
| | | 455/41.1 |
| 2012/0317628 A1 | 12/2012 | Yeager |
| 2013/0021145 A1 | 1/2013 | Boudy |
| 2014/0057560 A1 | 2/2014 | Lin et al. |
| 2014/0297897 A1* | 10/2014 | Halim .................. G06F 13/409 |
| | | 710/14 |
| 2015/0118958 A1 | 4/2015 | Jain et al. |
| 2016/0219637 A1 | 7/2016 | Dory et al. |

FOREIGN PATENT DOCUMENTS

| | | |
|---|---|---|
| EP | 1958470 B1 | 8/2010 |
| EP | 2581867 A2 | 4/2013 |
| KR | 20130042397 A | 4/2013 |
| WO | 2013038047 A1 | 3/2013 |
| WO | 2015038104 A1 | 3/2015 |

OTHER PUBLICATIONS

United States Patent and Trademark Office, "Final Office Action," issued in connection with U.S. Appl. No. 14/917,395, dated Feb. 27, 2017, 11 pages.

United States Patent and Trademark Office, "Final Office Action," issued in connection with U.S. Appl. No. 14/917,395, dated May 26, 2017, 15 pages.

United States Patent and Trademark Office, "Notice of Allowance," issued in connection with U.S. Appl. No. 14/917,395, dated Aug. 11, 2017, 24 pages.

International Searching Authority, "Written Opinion," issued in connection with International Patent Application No. PCT/US2013/059105, dated May 27, 2014, 4 pages.

International Searching Authority, "International Search Report," issued in connection with International Patent Application No. PCT/US2013/059105, dated May 27, 2014, 3 pages.

International Searching Authority, "International Preliminary Report on Patentability," issued in connection with International Patent Application No. PCT/US2013/059105, dated Mar. 15, 2016, 5 pages.

Dunnebeil et. al., "Encrypted NFC Emergency Tags Based on the German Telematics Infrastructure", 2011, Third International Workshop on Near Field Communication, 7 pages.

* cited by examiner

NEAR FIELD COMMUNICATION (NFC) DATA TRANSFER

RELATED APPLICATIONS

This patent arises from a continuation of U.S. patent application Ser. No. 14/917,395, which was filed on Mar. 8, 2016, which is a national stage application of International Application No. PCT/US2013/059105, which was filed on Sep. 11, 2013. U.S. patent application Ser. No. 14/917,395 and International Application No. PCT/US2013/059105 are incorporated herein by reference in their entireties.

BACKGROUND

Connectivity between a host device (e.g., mobile device, notebook, etc) and a peripheral device (e.g., printer/fax/scanner, wireless access point, etc) is typically accomplished using software, state change switches, or some other type of peripheral login credentials. The connection process often requires specific information about the host device and/or the peripheral device.

BRIEF DESCRIPTION OF THE DRAWINGS

The present application may be more fully appreciated in connection with the following detailed description taken in conjunction with the accompanying drawings, in which like reference characters refer to like parts throughout, and in which.

DETAILED DESCRIPTION

Establishing wireless connectivity between a computing device and another computing device (e.g., a peripheral device) can be burdened with technical issues such as knowing how to place the peripheral device into a discovery mode (i.e., a state change) and know strings such as service set identification (SSID), security process, login names, passwords, and other information about the peripheral device (e.g., an all-in-one system, a wireless access point, etc.). If such information about the peripheral device is lost or forgotten, connection between the computing device and a host device (e.g., a notebook computer, a smartphone, a tablet, a personal digital assistant (PDA), etc) may be difficult or impossible. One solution may be to provide the information on a near field communication (NFC) tag.

NFC is a set of standards for smartphones and similar devices to establish radio communication with each other by touching them together or by bringing them into close proximity, usually no more than a few inches. Some applications of the NFC technology include contactless transactions, data exchange, and simplified setup of more complex communications such as Wi-Fi®. Thus, NFC uses a tap-to-connect or tap-to-share technology that involves bringing two devices close together, thereby triggering the NFC functionality and performing an intended operation (e.g., connecting the devices for data sharing or performing a transaction). However, if one or both of the host device and the peripheral device are not mobile, portable, or are inconvenient to bring into close proximity, then the tap-to-share feature may not be feasible or may be too awkward to use for establishing connection between the two devices for sharing data or executing other transactions.

Accordingly, examples described herein address the above challenges by providing a computing device (e.g., a peripheral device) that includes an NFC component that houses a removable NFC tag. The NFC tag may contain, for example, data related to the identification and login credentials to allow a second computing device (e.g., a host device) to connect with the computing device. When the NFC tag is removed from the peripheral device, the peripheral device is placed in a predefined mode. In some examples, the predefined mode may include a discovery mode, a data transfer mode, a pairing mode, or any other operational mode of the peripheral device. The operational mode may be based on the type of peripheral device and/or functionality of the peripheral device. Thus, removal of the NFC tag from the peripheral device activates the operational mode in the peripheral device.

The NFC tag is brought in proximity of the host device to execute data transfer to the host device (e.g., via tapping or by close proximity). An NFC reader of the host device may read and/or receive the data. Accordingly, connection information, login credentials, identification information, security information, and other types of information that may be required to establish the connection is transferred to the host device. The connection and execution of the predefined mode may be completed after the data is received by the host device, or after the NFC tag is reinserted into the peripheral device. The connection may be via Bluetooth, Wi-Fi® Direct, wireless local area network (WLAN) connection, cellular network, ad-hoc network connection, or any other long range or short range connection.

In one example, a method for near field communication (NFC) data transfer includes placing a first device in a predefined mode in response to removing an NFC tag from an NFC component of the first device. The method includes receiving a request from a second device to establish a connection with the first device based on data stored on the NFC tag. The method also includes establishing the connection with the second device and executing the predefined mode.

In another example, a computing device includes a near field communication (NFC) component including an NFC tag and a controller. The controller is to place the computing device in a predefined mode in response to detecting that the NFC tag is removed from the NFC component. The controller is to establish a connection with a second device in response to a request for connection from the second device based on data stored on the NFC tag. The controller is further to execute the predefined mode with the second device.

In another example, a non-transitory computer-readable storage medium includes instructions that, when executed cause a controller to detect that a near field communication (NFC) tag is removed from an NFC component of a computing device. The instructions cause the controller to place the computing device in a predefined operational mode in response to the detection. The instructions cause the controller to receive a request for connection from a second device based on data contained in the NFC tag and to establish the connection with the second device and execute the predefined operational mode, in response to detecting that the NFC tag is returned to the NFC component.

Figure 1:
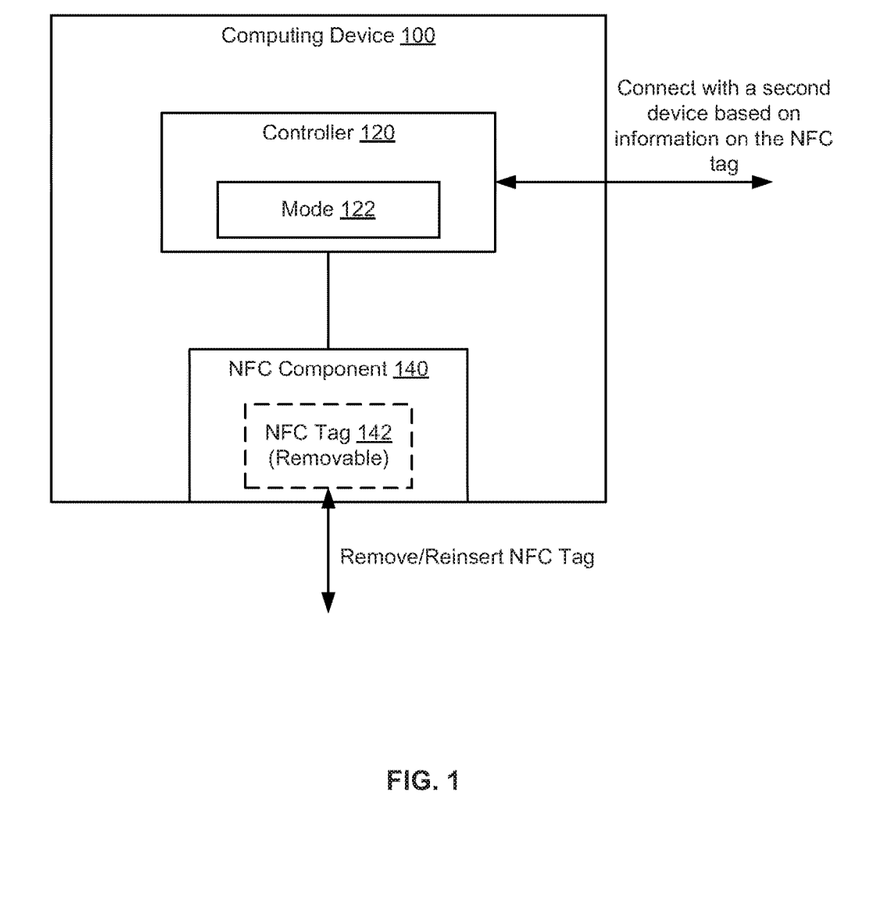
FIG. 1 illustrates an example of a computing device including a controller to place the computing device in a predefined mode when an NFC tag is removed from the computing device.

FIG. 1 illustrates an example of a computing device 100 including a controller 120 to place the computing device in a predefined mode 122 when an NFC tag 142 is removed from the computing device 100. The computing device 100 can be a peripheral device such as an all-in-one system, a wireless access point, or any other device that can provide data and/or connection services to another device.

The computing device 100 includes a controller 120 and an NFC component 140, and a removable NFC tag 142 in the NFC component 140, where the NFC tag stores data usable by a second device for connecting with the computing device 100. The controller 120 can be a processor, a semiconductor-based microprocessor, an integrated circuit (IC), or any other device suitable for managing the connection of the computing device 100 with a second device and for executing the operational mode 122 of the computing device 100. The mode 122 of the computing device 100 can be a data transfer mode, a pairing mode, a discovery mode, or any other operational mode of the computing device 100.

NFC component 140 includes software, hardware, and/or firmware which can be utilized independently and/or in conjunction with the controller 120 to manage the NFC tag 142. For example, NFC component 140 houses the NFC tag 142 and may have the ability to program or reprogram the NFC tag 142 (i.e., write or rewrite data onto the NFC tag 142). In one example, if the NFC component 140 includes software and/or firmware, the NFC component can be stored on a non-volatile computer-readable medium included in or accessible to the computing device 100.

In response to detecting that the NFC tag 142 has been removed from the NFC component 140, the controller 120 places the computing device in the predefined mode 122. The predefined mode 122 may be a discovery mode, a data transfer mode, a pairing mode, or any other operational mode of the computing device 100. For example, in the discovery mode, the computing device 100 may advertise a list of services available to other devices. The list of services may include, for example, email printing services, downloadable applications, scanning services, fax services, network access, and so on. The list of services provided by the computing device 100 may be dependent on the capabilities of the computing device 100. As another example, in the data transfer mode, computing device 100 may exchange data with another computing device. As another example, in the pairing mode the computing device 100 may associate and/or connect with another device to provide services. In the pairing mode, the computing device 100 may connect with another device to perform a transaction or function.

Thus, removal of the NFC tag 142 from the computing device 100 activates/triggers the operational mode 122 in the computing device 100. For example, circuitry and/or software/firmware for executing the mode 122 may be activated at the computing device 100. It should be noted that other operational modes may be executed by the computing device 100. In certain examples, the computing device 100 is placed in an active state (e.g., discovery mode) when the NFC tag 142 is removed from the computing device 100. However, when the NFC tag 142 remains in the computing device 100, the computing device 100 is in an inactive state (e.g., not seeking devices to initiate connection activity).

The NFC tag 142 may include data to facilitate connection with the second device and/or information related to the mode 122 of the computing device. For example, the NFC tag 142 may include identification and login credentials, security information, and other information/data to facilitate the connection with the second device. The data stored in the NFC tag 142 is readable by an NFC reader of the second device and transferrable to the second device.

When the NFC tag 142 is brought in close proximity or in contact with the NFC reader of the second device, transfer of data from the NFC tag 142 to the second device is initiated. The data on the NFC tag 142 may trigger or activate circuitry, software, and/or firmware in the second device to establish connectivity with the computing device 100. For example, the second device may begin to search for devices in the predefined mode 122 (e.g., pairing mode) and find the computing device 100 to already be in the mode 122, making it easier for the second device 100 to connect with the computing device 100.

In some example, the connection is established once the data is transferred from the NFC tag 142 to the second device. In other examples, the connection is established after the NFC tag 142 is reinserted into the computing device 100. In this example, reinserting the NFC tag 142 completes the connection process between the computing device 100 and the second device. In either example, once the connection has been established, the mode 122 can be executed between the computing device 100 and the second device. For example, once the connection is established, data (e.g., content, files, etc) can be exchanged between the computing device 100 and the second device.

Figure 2:
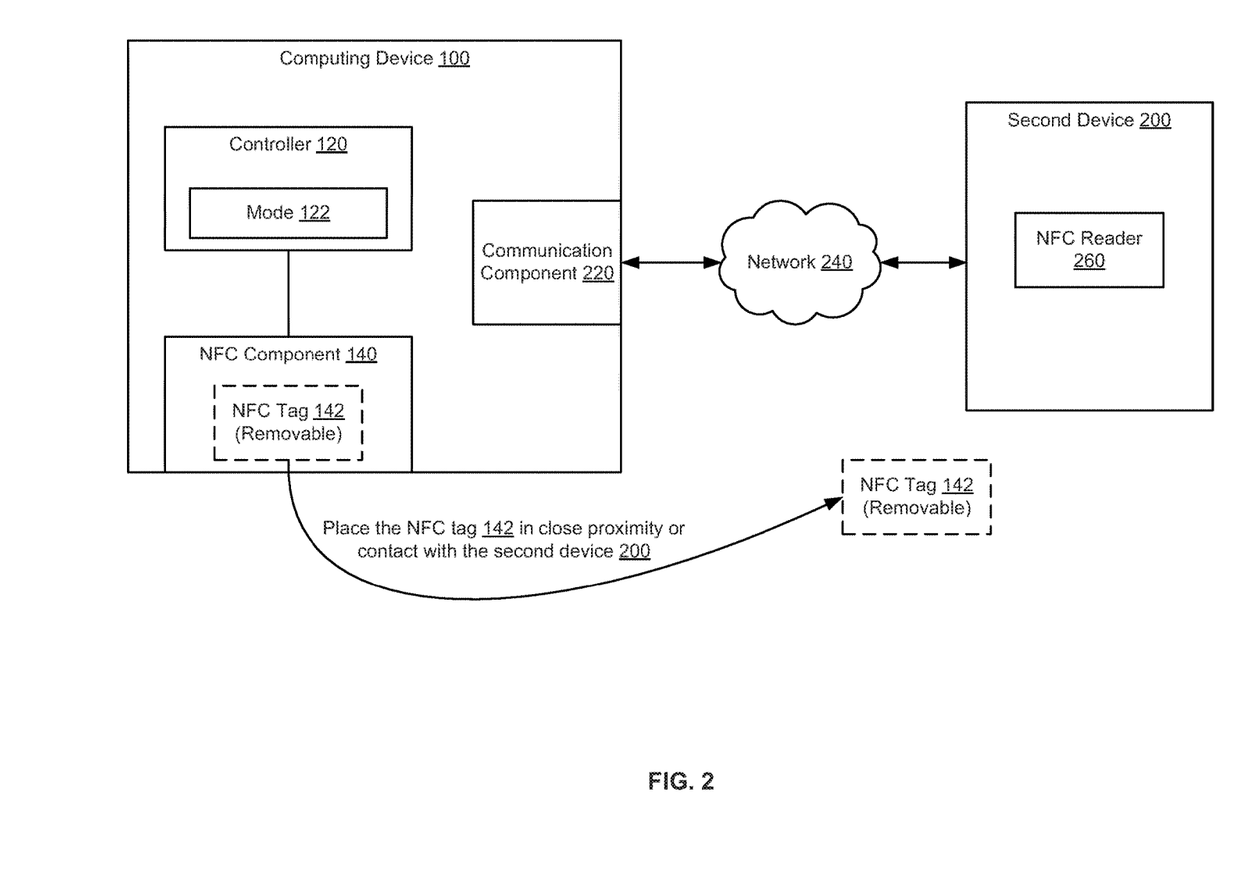
FIG. 2 illustrates another example of a computing device including a controller to place the computing device in a predefined mode when an NFC tag is removed from the computing device.

FIG. 2 illustrates an example of a computing device 100 including a controller 120 to place the computing device 100 in a predefined mode 122 when an NFC tag 142 is removed from the computing device 100 and transported to a second device 200. In the example of FIG. 2, computing device 100 includes a communication component 220 for establishing a wireless connection with the second device 200. Communication component 220 is a hardware component, such as a network interface controller, a wireless radio, a Bluetooth component, and/or infrared component to communicate wirelessly with second device 200 over a network 240. The wireless network 240 can be a WLAN, wireless personal area network (WPAN), cellular network, Bluetooth network, ad-hoc network, or any other network.

As noted above, the controller 120 initially detects when the NFC tag 142 is removed from the NFC component 140 of the computing device 100. In response to the detection, the controller 120 places the computing device in a particular mode 122. For example, the controller 120 may activate a circuitry, software, and/or firmware to place the computing device 100 in a discovery mode, a pairing mode, a data transfer mode, or any other operational mode.

When the NFC tag 142 is brought in close proximity or brought in contact with the second device 200, the NFC reader 260 of the second device 200 reads the data stored on the NFC tag 142. In some examples, the data includes connection information, identification and login information, and other information that may be required to establish a connection with the computing device 100. In certain examples, the data from the NFC tag 142 may trigger the activation of circuitry, software, and/or firmware in the second device 200 to search for the computing device 100, thus making it easy for the second device 200 to connect with the computing device 100. In some examples, the second device 200 may send a request for connection to the computing device 100 (e.g., since the second device 200 has information related to the location, identity, and/or services provided by the computing device). Subsequently, the computing device 100 can establish a wireless connection with the second device 200 and execute the predefined mode 122 (e.g., data transfer, pairing, provide services, etc) with the second device 200 using the communication component 220. In certain examples, the connection is established after the NFC tag 142 is reinserted/returned to the NFC component 140 of the computing device 100. In such an example, the connection process is completed when the NFC tag 142 is detected to be inserted into the computing device 100.

Figure 3:
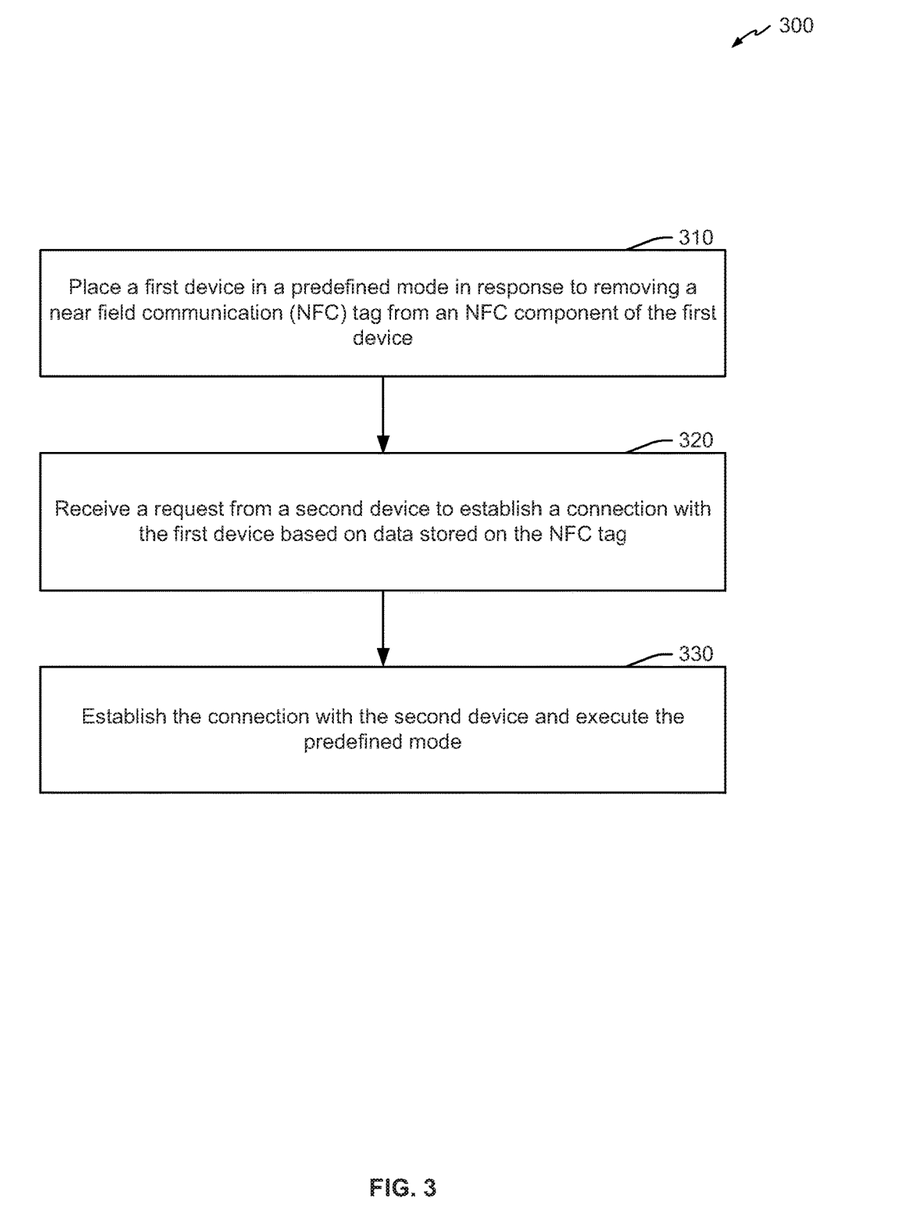
FIG. 3 is an example flowchart illustrating a method for NFC data transfer between a first device and a second device.

FIG. 3 is an example flowchart illustrating a method for NFC data transfer between a first device and a second device. Method 300 may be implemented, for example, in the form of executable instructions stored on a non-transitory computer-readable storage medium and/or in the form of electronic circuitry.

Method 300 includes placing a first device in a predefined mode in response to removing an NFC tag from an NFC component of the first device, at 310. For example, the first device can be placed in a pairing mode, a data transfer mode, or a discovery mode in response to detecting that the NFC tag has been removed from the first device. In other examples, the first device is removed from a passive mode and placed in an active mode, in response to the removal.

Method 300 includes receiving a request from a second device to establish a connection with the first device based on data stored on the NFC tag, at 320. For example, the data stored on the NFC tag can be transferred to the second device, when the NFC tag is brought in close proximity or in contact with the second device. The data may include login credentials, identification information, and other information to facilitate a connection with the first device. In certain examples, the data from the NFC tag causes the second device to search for devices in a particular mode, and to find the first device in the particular mode.

Method 300 also includes establishing the connection with the second device and executing the predefined mode, at 330. For example, because the second device knows the location and/or identity of the first device, the second device may send a request for connection, and in response, the first device establishes the connection and executes the predefined mode. In some examples, the method 300 of FIG. 3 includes additional steps in addition to and/or in lieu of those depicted in FIG. 3.

Figure 4:
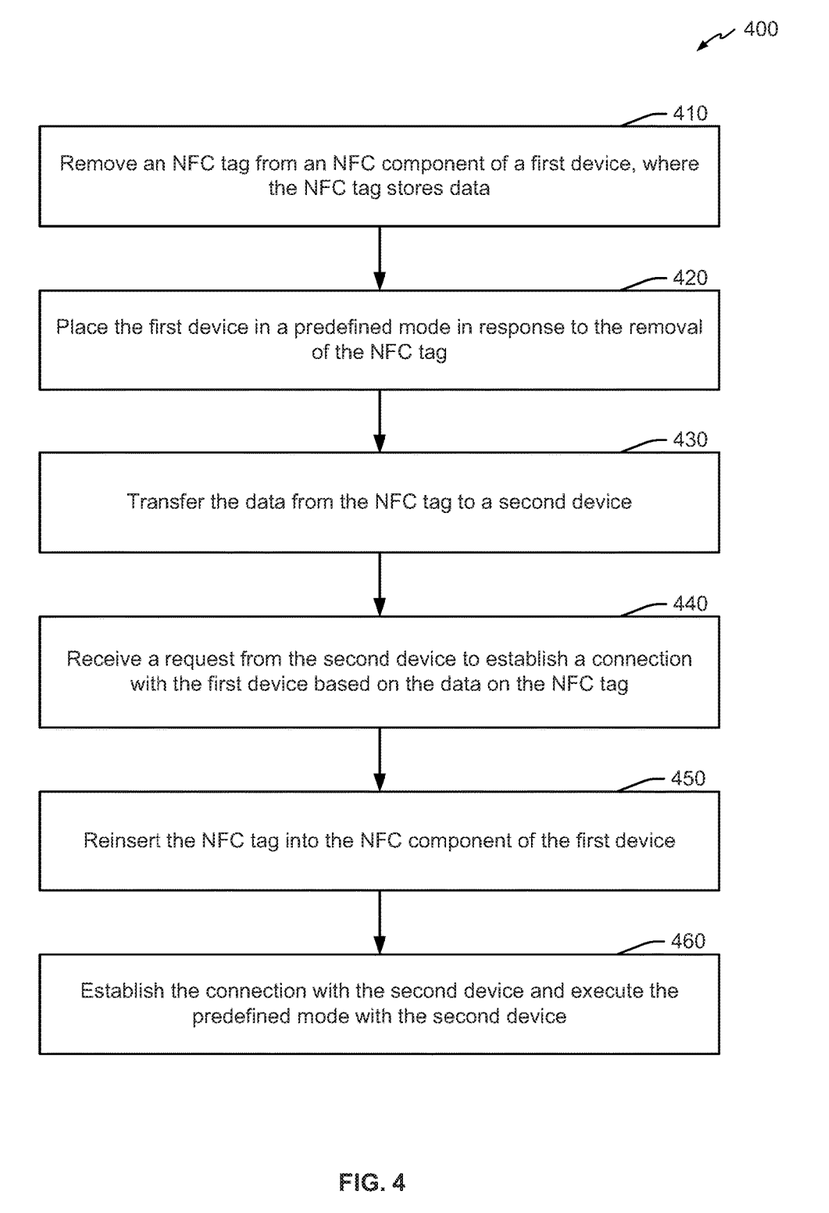
FIG. 4 is another example of a flowchart illustrating a method for NFC data transfer between a first device and a second device.

FIG. 4 is an example flowchart illustrating a method for NFC data transfer between a first device and a second device. Method 400 may be implemented, for example, in the form of executable instructions stored on a non-transitory computer-readable storage medium and/or in the form of electronic circuitry.

Method 400 includes removing an NFC tag from an NFC component of a first device, where the NFC tag stores data, at 410, and placing the first device in a predefined mode in response to the removal of the NFC tag, at 420. For example, the first device may be placed in a pairing mode, a data transfer mode, a discovery mode, or any other operational mode in response to the removal of the NFC tag. In other examples, the first device is placed in an active mode (from a passive mode) in response to the removal.

Method 400 includes transferring the data from the NFC tag to a second device, at 430. For example, data stored on the NFC tag is transferred to a second device when the NFC tag is placed in close proximity or in contact with the second device via NFC transfer protocol.

Method 400 includes receiving a request from the second device to establish a connection with the first device based on the data on the NFC tag, at 440. For example, the data on the NFC tag may include location, identification, login credentials of the first device, communication protocols used by the first device, or any other information that may facilitate connectivity with the first device. Based on the data, the second device may send a connection request.

Method 400 includes reinserting the NFC tag into the NFC component of the first device, at 450, and establishing the connection with the second device and executing the predefined mode with the second device, at 460. For example, the connection and execution processes are complete when the NFC tag is replaced into the first device. In some examples, the method 400 of FIG. 4 includes additional steps in addition to and/or in lieu of those depicted in FIG. 4.

Figure 5:
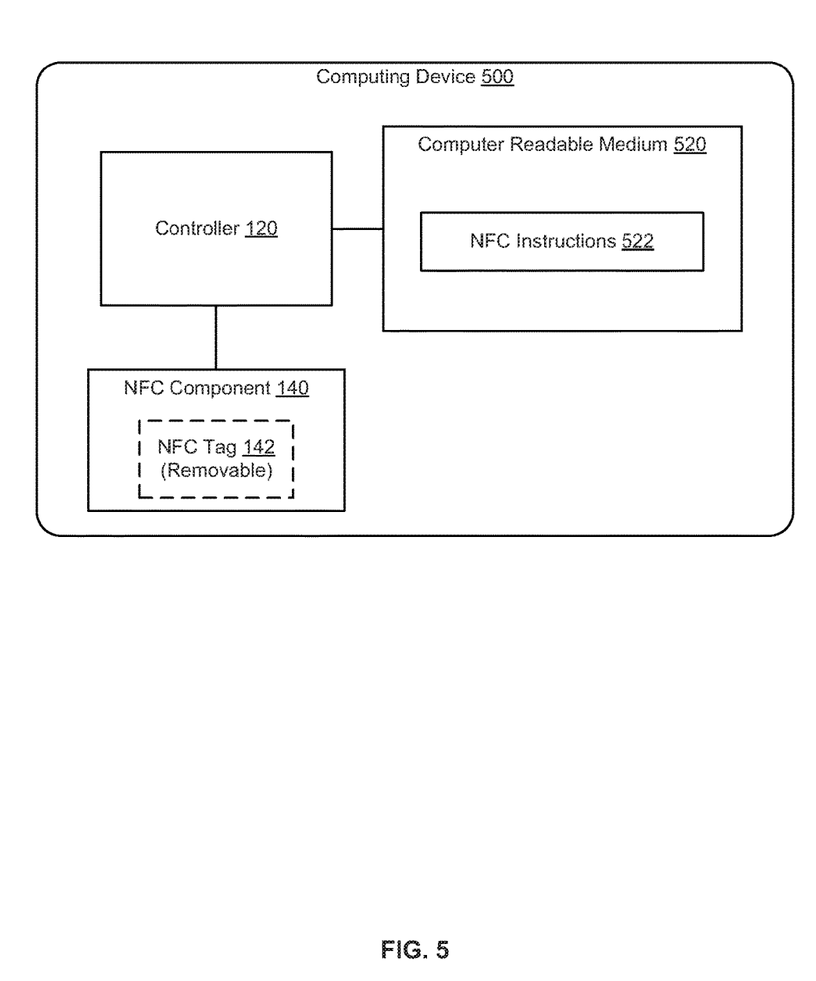
FIG. 5 illustrates an example of a computing device including a computer-readable medium having instructions to place the computing device in a predefined mode when an NFC tag is removed from the computing device.

FIG. 5 illustrates an example of a computing device including a computer-readable medium having instructions to place the computing device in a predefined mode when an NFC tag is removed from the computing device. The computing device 500 can include a non-transitory computer-readable medium 520. The non-transitory computer-readable medium 520 can include instructions 522 that if executed by a controller 120 can cause the controller 120 to perform the functionality described below.

For example, the NFC instructions 522 are executable by the controller 120 to detect that an NFC tag 142 is removed from an NFC component 140 of the computing device 500, and to place the computing device 500 in a predefined operational mode in response to the detection. The NFC instructions 522 are further executable by the controller 120 to receive a request for connection from a second device based on data contained in the NFC tag 142, and to establish the connection with the second device and execute the predefined operational mode, in response to detecting that the NFC tag 142 is returned to the NFC component 140.

The techniques described above may be embodied in a computer-readable medium for configuring a computing system to execute the method. The computer-readable media may include, for example and without limitation, any number of the following non-transitive mediums: magnetic storage media including disk and tape storage media; optical storage media such as compact disk media (e.g., CD-ROM, CD-R, etc.) and digital video disk storage media; holographic memory; nonvolatile memory storage media including semiconductor-based memory units such as FLASH memory, EEPROM, EPROM, ROM; ferromagnetic digital memories; volatile storage media including registers, buffers or caches, main memory, RAM, etc.; and the Internet, just to name a few. Other new and obvious types of computer-readable media may be used to store the software modules discussed herein. Computing systems may be found in many forms including but not limited to mainframes, minicomputers, servers, workstations, personal computers, notepads, personal digital assistants, tablets, smartphones, various wireless devices and embedded systems, just to name a few.

In the foregoing description, numerous details are set forth to provide an understanding of the present disclosure. However, it will be understood by those skilled in the art that the present disclosure may be practiced without these details. While the present disclosure has been disclosed with respect to a limited number of examples, those skilled in the art will appreciate numerous modifications and variations therefrom. It is intended that the appended claims cover such modifications and variations as fall within the true spirit and scope of the present disclosure.

What is claimed is:

1. A computing device comprising:
   a near field communication (NFC) component;
   a NFC tag including connection data; and
   a controller to:
   place the computing device in a first operating mode when the NFC tag is connected to the NFC component,
   place the computing device in a second operating mode when the NFC tag is not connected to the NFC component, the second operating mode corresponding to an active state of the computing device, and
   enable a wireless connection between the computing device and a host device when the computing device is in the second operating mode.

2. The computing device of claim 1, wherein the second operating mode includes at least one of a discovery mode, a data transfer mode or a pairing mode.

3. The computing device of claim 2, wherein the first operating mode includes an inactive state.

4. The computing device of claim 3, wherein the controller is to establish a wireless connection between the computing device and the host device when the computing device is in the second operating mode.

5. The computing device of claim 4, wherein the connection data includes at least one of connection information, security information, an identification of the computing device, or information related to the second operating mode.

6. A method comprising:
   in response to connection of a near field communication (NFC) tag to a NFC component of a device, activating, by executing an instruction with a processor, a first operating mode of the device;
   in response to disconnection of the NFC tag from the NFC component, activating, by executing an instruction with the processor, a second operating mode of the device, the second operating mode corresponding to an active state of the device; and
   in response to the activation of the second operating mode, establishing a wireless connection between the device and a host device.

7. The method of claim 6, wherein the second operating mode includes at least one of a discovery mode, a data transfer mode, or a pairing mode.

8. The method of claim 6, further including transferring the connection data from the NFC tag to the host device following the disconnection of the NFC tag from the NFC component.

9. The method of claim 6, wherein the establishing of the wireless connection includes establishing at least one of a Bluetooth connection, a Wi-Fi Direct connection, a wireless local area network (WLAN) connection, a cellular network connection, or an ad-hoc network connection.

10. The method of claim 6, wherein the activating of the second operating mode includes activating at least one of electronic circuitry and executable instructions to perform the second operational mode.

11. The method of claim 6, further including transferring at least one of connection information, security information, identification information, or information related to the second operational mode to the host device.

12. A computer-readable memory comprising instructions that, when executed cause a computing device to at least:
   activate a first operational mode when a near field communication (NFC) tag is connected to an NFC component of the computing device;
   in response to detecting disconnection of the NFC tag from the NFC component, activate a second operational mode of the computing device, the second operating mode corresponding to an active state of the computing device;
   in response to a request for a wireless connection from a host device, establish a wireless connection between the computing device and the host device while the computing device is in the second operational mode; and
   in response to detecting connection of the NFC tag to the NFC component, activate the first operational mode.

13. The computer-readable memory of claim 12, wherein the second operational mode includes at least one of a discovery mode, a data transfer mode, or a pairing mode.

14. The computer-readable memory of claim 13, wherein the first operating mode includes an inactive state.

15. The computer-readable memory of claim 13, wherein the instructions, when executed, cause the computing device to activate the second operating mode by activating electronic circuitry to perform the second operational mode.

16. The computer-readable memory of claim 13, wherein the instructions, when executed, cause the computing device to establish the wireless connection by establishing at least one of a Bluetooth connection, a Wi-Fi Direct connection, a wireless local area network (WLAN) connection, a cellular network connection, or an ad-hoc network connection.

17. The computing device of claim 1, wherein the controller is to place the computing device in the second operating mode by detecting a disconnection of the NFC tag from the NFC component and triggering the second operating mode based on the detected disconnection.

* * * * *